United States Patent [19]

Marshall et al.

[11] 3,893,171

[45] July 1, 1975

[54] SIGNAL ADJUSTMENT CIRCUIT

[75] Inventors: John W. Marshall; Earl G. McDonal, Jr., both of Boulder; Phillip B. Roath, Longmont, all of Colo.

[73] Assignee: International Business Machines Corporation, Armonk, N.Y.

[22] Filed: Mar. 25, 1974

[21] Appl. No.: 454,500

[52] U.S. Cl. .......................... 360/45; 340/146.1 AB

[51] Int. Cl. .............................................. G11b 5/09

[58] Field of Search ....... 340/146.1 AB; 360/39, 40, 360/45, 53

[56] References Cited

UNITED STATES PATENTS

| | | | |
|---|---|---|---|
| 3,067,422 | 12/1962 | Hunt | 360/45 |
| 3,483,539 | 12/1969 | Poomakis | 360/45 |
| 3,831,194 | 8/1974 | Perel et al | 360/45 |

*Primary Examiner*—Vincent P. Canney
*Attorney, Agent, or Firm*—Herbert F. Somermeyer

[57] ABSTRACT

Signals read back from a magnetic record medium have assigned sets of legal wavelengths, i.e., elapsed times between any successive two transitions. During readback, the zero crossover, hence the transition location, can be unintentionally phase shifted (as by base line changes) by the channel. The signal is detected and converted to a string of 1's and 0's, wherein the 1's represent detected transitions. A set of three such wavelengths is analyzed for illegal code values representing illegal wavelengths. The illegal code value is then converted to a legal code in accordance with the two adjacent code values in such set. In one embodiment, the illegal code value represented a wavelength that was too short. One of the transitions defining the illegal wavelength is shifted in time toward the longer of two other wavelengths immediately abutting the short illegal wavelength.

7 Claims, 4 Drawing Figures

SIGNAL ADJUSTMENT CIRCUIT

BACKGROUND OF THE INVENTION

The present invention relates to error elimination circuits, particularly those circuits for adjusting transition times in a digital signal for compensating for perturbations in such signal.

So-called "MFM" (modified frequency modulation) signals have a detection window which is 50% of the minimum signal wavelength. Because of this detection property, three signals can be described in terms of wavelengths as follows. A 2F signal equals 101, wherein the 1's are transitions in a detection window; and the 0's are the absence of a transition. The other two wavelengths are 1.5F wavelength of 1001 and a 1F wavelength of 10001. These constraints on a digital recorder reduce bandwidth and enhance self-clocking properties of the recorder—a desirable characteristic. Because of perturbations introduced into the signals by a recorder, the above-identified three legal wavelengths can be converted from a 101 to a 11 or from a 10001 to a 100001 sequence, i.e., error conditions. Either of the illegal wavelengths can be caused by a simple transposition error resulting from phase shift caused by base line shift or other signal perturbations. The "base line shift" usually results from the dominant signal lobe (longer wavelength).

Analysis has demonstrated that the illegal sequence 11 results primarily from base line shift occurring in a defect area. A common failure occurs when the base line of the 2F signal 101 has a transition shifted by an adjacent signal of a lower frequency yielding the short illegal wavelength 11.

Applicants have discovered that whenever a 11 sequence occurs, an extra 0 also appears on one or the other side of the sequence. The present invention provides means for detecting where the extra 0 appears and the subsequent adjustment of the transition for making the 11 sequence a legal 101.

SUMMARY OF THE INVENTION

It is an object of the invention to provide a simple, but reliable, transition adjustment circuit for correcting for phase or base line perturbations of a signal being processed.

In accordance with the invention, a transition illegally located in a digital signal is adjusted in phase time by converting the digital signal to a serial set of code signals; then, such set is examined for illegal code values of a short wavelength. Then, the code values adjacent such short wavelength are examined; and the illegal code value is converted to another legal code value in accordance with the relative values of the adjacent code values. Finally, an output signal is generated in accordance with the converted serial set.

The incoming signal is converted to strings of 1's or 0's, where 1 represents a transition and 0 represents absence of a transition in a detection window of a bandwidth-limited digital signal. The 1's also represent zero crossovers in the readback signal from a digital recorder. First, second, and third successive wavelengths are analyzed, such wavelengths being separated by a given two signal transitions. Then, the lengths of the first and third wavelengths are compared to determine which of the wavelengths are longer; and one of the two signal transitions are adjusted, either in an advance or retard phase, to the next adjacent detection window in accordance with a comparison of the first and third wavelengths. In a preferred mode, particularly using an MFM type of signal, the adjustment is toward the code value having the greatest number of 0's in a row, i.e., a longer one of the two first and third wavelengths.

Also included in this invention is the wavelength analyzer and advance and retard controls for a digital readback signal processing circuit.

The foregoing and other objects, features, and advantages of the invention will become apparent from the following more particular description of the preferred embodiment of the invention, as illustrated in the accompanying drawing.

THE DRAWING

DETAILED DESCRIPTION

Figures 1, 2, 3, 4:
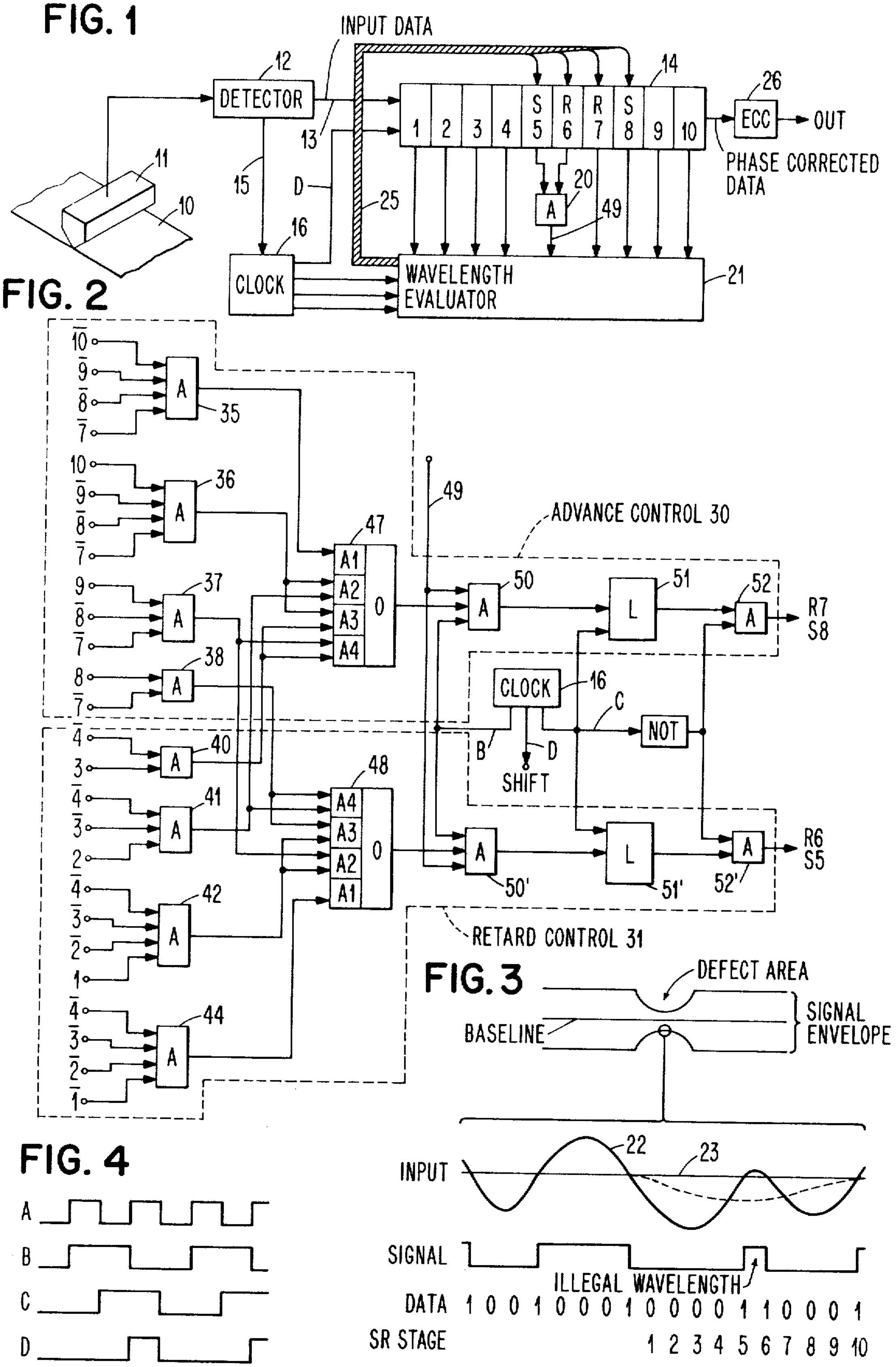
FIG. 1 is a simplified diagrammatic showing of a readback circuit for a digital signal recorder which incorporates the teachings of the present invention.
FIG. 2 is a logic diagram of a wavelength evaluator and control circuit for use with the FIG. 1 illustrated readback circuit.
FIG. 3 is a diagrammatic waveform diagram of signals used to describe the operation of the invention with respect to FIG. 1.
FIG. 4 is a simplified showing of clock signals used to time the FIGS. 1 and 2 illustrated circuits.

Signals recorded on a record medium 10, preferably in an MFM encoding, are sensed by transducer 11 and are supplied to a signal detector 12 of the self-clocking type. Such a detector usable with the present circuit arrangement is shown by Vermeulen in U.S. Pat. No. 3,548,327, no limitation thereto intended. Detector 12 supplies data signals over line 13 to shift register 14 having stages 1–10 and synchronously supplies clock synchronizing signals over line 15 to clock circuit 16. Each stage 1–10 of shift register 14 contains a binary 1 or 0 supplied by detector 12 in the respective successive detection windows, as represented by the 1's and 0's in FIG. 3.

Each stage is synchronously shifted by shift pulse D derived from clock 16 to contain a serial set of digital signals representing at least three successive permissible wavelengths of the MFM detected signal. The 11 pattern contained in shift register 14, detected by AND circuit 20, is supplied to wavelength evaluator 21 along with the rest of the digital signals, as will be more fully described with respect to FIG. 2.

Referring to FIG. 3, the 11 illegal wavelength sequence is shown as being contained in shift register stages 5 and 6. This particular phase shift is caused by a base line shift of the input or readback signal 22 caused by a defect in the record medium or perturbations from the data signal channel. The base line 23 of signal 22 is shifted upwardly from the desired base line. Alternately, the signal can be considered as being shifted downwardly from desired base line. Using either consideration, there is a relative shift of signal and base line in the error area resulting in a false data indication.

Wavelength evaluator 21 receives all of the signals from shift register 14 and determines which of the two wavelengths adjacent the illegal 11 wavelength is the longer of the two. Then, it sends control signals over cable 25 to shift register stages 5, 6, 7, and 8 for adjusting the transition toward the longer one of the two immediately adjacent wavelengths. For example, in FIG.

3, the first-occurring adjacent wavelength is the 10001 pattern contained in stages 6, 7, 8, and 9; while the third successive or last-occurring wavelength is the longer of the two and is represented by the signals 100001 in stages 1–5, respectively, of register 14. Accordingly, the binary 1 in shift register stage 6 is shifted or retarded to create a corrected code value pattern 1000101001, wherein the leftmost 1 is in stage 2 of shift register 14 after shifting and correction. The rightmost 1 is in stage 10. Shift register 14 then supplies the converted serial data pattern to ECC circuits 26 for further processing. ECC 26 can be constructed using any known error detection and correction coding apparatus.

Referring next to FIG. 2, wavelength evaluator 21 has a phase advance control 30 and a phase retard control 31. The signals from the shift register stages are labeled as 1–10 for indicating a binary 1 is contained in the stage (i.e., 9) and a bar over the numbered stage for indicating a binary 0 (i.e., $\bar{9}$). The four input AND circuits 35–38 of circuit 30 and input AND's 40–44 of circuit 31 detect the number of 0's in a row representing adjacent wavelengths. These signal patterns include the three legal or acceptable wavelengths 101, 1001, and 10001, plus the illegal wavelength 100001 (four 0's). AND circuit 35 detects four 0's, respectively, in stages 7–10 for a code value 10000 (the 1 is in stage 6). AND circuit 36 detects three successive 0's in stages 7–9 for a code value of 10001 (left 1 is in stage 6, right 1 is in stage 10), AND circuit 37 detects two successive 0's in stages 7 and 8 for a code value of 1001 (left 1 is in stage 5, right 1 is in stage 10), while AND circuit 38 detects a single 0 in stage 7. The logic of such detection is apparent from examination of the figure. In a similar manner, AND's 40–44 detect adjacent strings of one, two, three, and four 0's, respectively.

The below tables illustrate operation of the described operation.

| | |
|---|---|
| **Shift Register Stage** | 1 2 3 4 5 6 7 8 9 10 |
| **Initial Contents** | 0 0 0 0 1 1 0 0 1 0 |

Stages 5 and 6 show error; stages 1–4 have the longest wavelength.

| | |
|---|---|
| **Reset Stage 5** } **Preset Stage 4** } | 0 0 0 1 0 1 0 0 1 0 |
| **Shift Right** | 1 0 0 0 1 0 1 0 0 1 |

The "1" in stage 1 represents a transition being entered into the shift register. Note that preset and reset can be combined with shift operation.

The output signals of the input AND's 35–44 are supplied to two AND/OR's 47 and 48. These AND/OR's (A-O's) combine the output of the input AND circuits to determine which of the two adjacent wavelengths (represented by strings of 0's), the first or third successive wavelengths, is the longer such that the short illegal wavelength represented by the binary 1's in stages 5 and 6 can be appropriately adjusted. The A1 (AND) portion of A-O circuit 47 passes the four 0's signal from AND 35 to the control part of circuit 30. In a similar manner, AND circuit portion A2 of circuit 47 combines the output signals of input AND 41 indicating two 0's in the lagging part of the waveform, with three 0's in the leading part of the waveform. Also, the A3 input portion of circuit 47 combines the three 0's indicating signal from AND 36 with the one 0 indicating signal from AND 40 to also provide a phase advance control signal. Finally, A4 input portion combines the one 0 indicating signal indicating signal from AND 40 indicating the lagging or third successive wavelength as one 0, with the AND circuit 37 two 0's indicating signal for the first or leading wavelength to also generate a phase advance control. In a similar manner, AND/OR 48 combines the outputs of the input AND's for determining that the phase retard control signal should be generated. The logic is as stated for circuit 47, A1–A4 portions, but for a phase retard determination.

The phase advance control signal from A-O 47 passes through timing control AND circuit 50 to the D input of D-type phase advance latch 51. The output of AND circuit 20 supplied over line 52 indicates to AND 50 that an illegal wavelength of the 11 type has been detected; hence, a phase advance signal should be generated and supplied for storage to the D-type latch 51. Clock 16 supplies the C timing signal to the C input of latch 51 for gating the output of AND 50 to latch 51. Latch 51, in turn, supplies its stored phase advance control signal to AND circuit 52, which is gated by the $\bar{C}$ signal, the inverse of signal C of FIG. 4. This signal is supplied over cable 25 to reset stage 7 and set stage 8 during the shift phase. For example, initially, stages 3, 4, 5, 6, 7, 8, and 9, respectively, contain a 1011001. During the shift for the next detection window time, contents for stages 4–9 are 101010 which is the desired phase time correction.

In a similar manner, phase retard control circuit 31 passes the output of A-O 48 through AND circuit 50', D-type latch 51', thence to AND 52' for resetting stage 6 and setting stage 5 for adjusting the pattern in a phase retard manner. For example, the initial pattern in the above-stated shift register stages was 1001101. The phase retarded signal status would be 1010101. Examination of the FIGURES will show that other corrections will be similarly accomplished.

While the invention has been particularly shown and described with reference to a preferred embodiment thereof, it will be understood by those skilled in the art that various changes in form and detail may be made therein without departing from the spirit and scope of the invention.

What is claimed is:

1. A transition adjustment method, including the following steps in combination:

detecting an incoming signal and generating a string of timed 1 and 0 indicating digital signals having a series of transitions and representative of said incoming signal zero crossovers;

analyzing first, second, and third successive wavelengths separated by a given two signal transitions;

determining which of said first and third wavelengths are longer; and either adjusting a first one of said two signal transitions in time to make said second wavelength longer when said first wavelength being longer than said third wavelength or adjusting a second one of said two signal transitions when said third wavelength is longer than said first wavelength.

2. The method set forth in claim 1 further including the steps of:

reading a signal from a magnetic record member to generate said incoming signal;

determining whether or not said second wavelength is too short, and if too short, adjusting said first or second transition toward a longer one of said first and third wavelengths.

3. A digital signal transition adjustment circuit including in combination:

a shift register having a predetermined number of stages interconnected to shift data signals in a first direction from an input stage toward an output stage, each stage for containing a digital data signal;

decoding means connected to certain stages of said shift register for detecting the signal contents thereof including AND circuit means responsive to a given plurality of said stages central of said shift register for actuating a transition adjustment; and second AND circuit means responsive to said decoding means and to said first-mentioned AND circuit means in accordance with signal content of said central stages for supplying a reset signal to a given one of said stages and supplying a set signal to another one of said stages for adjusting signal contents thereof in accordance with the permutation in said shift register.

4. The circuit set forth in claim 3 wherein said central stages consist of two stages and said first-mentioned AND circuit means being responsive to two binary 1 indicating signals in said two stages for actuating said transition adjustment, and said second AND circuit means having a first AND portion for supplying said reset signal to one of said central stages and said set signal to another one of said central stages, and said second AND circuit means having a second AND portion for supplying a reset signal to predetermined ones of said shift register stages adjacent said central stages and intermediate said output stage and said central stages and a preset signal to another one of said shift register stages intermediate said output stage and said predetermined one shift register stage.

5. The apparatus set forth in claim 4 further including clocking means for supplying shift signals to said shift register shifting said data signal through said shift register in a synchronous manner and said clocking means supplying control signals intermediate said shift signals to said second AND circuit means for timing said set and reset signals.

6. The apparatus set forth in claim 5 wherein said decoding means actuates said first-mentioned signal transition adjustment when there is initially a greater plurality of successive 0 data signals in said shift register stages intermediate said output stage and said central stages than in stages intermediate said input stage and said central stages and actuating said second-mentioned signal transition adjustment when there is a greater number of successive 0's in the stages intermediate said input stage and said central stages than intermediate said output stage and said central stages.

7. A signal adjustment circuit for correcting transposition errors comprising a shift register having N stages, N being a positive integer greater than 4;

clock means for synchronously and continuously shifting data signals through said shift register from an input stage 1 toward an output stage N, through successive shift register stages 2, 3, ..., said data signal respresenting 1's and 0's;

means responsive to a pair of 1 signals in $N/2$ and in an $(N/2) + 1$ shift register stage to initiate changes in signal states in a selected two of said shift register stages;

decoding means responsive to a greater number of 0's in said shift register stages between $(N/2) + 1$ and $N$ than in said shift register stages 0 through $(N/2) - 1$ to clear a signal state from 1 to 0 in said $(N/2) + 2$ shift register stage and to preset said $(N/2) + 3$ shift register stage; and further means responsive to a greater number of 0's being in said shift register stages 0 through $(N/2) - 1$ than in said stages $(N/2) + 2$ through $N$ to supply a preset signal to said $N/2$ shift register stage and a reset signal to said $(N/2) + 1$ shift register stage.

* * * * *